Nov. 29, 1955 W. A. GEYGER 2,725,521

DIFFERENTIAL COUPLING CIRCUIT FOR MULTI-STAGE HALF-WAVE MAGNETIC SERVO AMPLIFIERS

Filed Jan. 26, 1955 4 Sheets-Sheet 1

INVENTOR
W. A. GEYGER

BY

W. O. Brennan
G. D. O'Brien
ATTORNEYS

Nov. 29, 1955 W. A. GEYGER 2,725,521
DIFFERENTIAL COUPLING CIRCUIT FOR MULTI-STAGE
HALF-WAVE MAGNETIC SERVO AMPLIFIERS
Filed Jan. 26, 1955 4 Sheets-Sheet 2

INVENTOR
W. A. GEYGER

BY

W. O. Quesenberry
G. D. O'Brien
ATTORNEYS

Nov. 29, 1955 W. A. GEYGER 2,725,521

DIFFERENTIAL COUPLING CIRCUIT FOR MULTI-STAGE HALF-WAVE MAGNETIC SERVO AMPLIFIERS

Filed Jan. 26, 1955 4 Sheets-Sheet 3

INVENTOR
W. A. GEYGER

BY

W. O. Quesenberry
G. D. O'Brien
ATTORNEYS

Nov. 29, 1955 W. A. GEYGER 2,725,521

DIFFERENTIAL COUPLING CIRCUIT FOR MULTI-STAGE HALF-WAVE MAGNETIC SERVO AMPLIFIERS

Filed Jan. 26, 1955 4 Sheets-Sheet 4

INVENTOR
W. A. GEYGER

BY

ATTORNEYS

United States Patent Office 2,725,521

Patented Nov. 29, 1955

2,725,521

DIFFERENTIAL COUPLING CIRCUIT FOR MULTI-STAGE HALF-WAVE MAGNETIC SERVO AMPLIFIERS

Wilhelm A. Geyger, Takoma Park, Md., assignor to the United States of America as represented by the Secretary of the Navy Application January 26, 1955, Serial No. 484,324

(Granted under Title 35, U. S. Code (1952), sec. 266)

18 Claims. (Cl. 323—89)

The invention described herein may be manufactured and used by or for the Government of the United States of America for governmental purposes without the payment of any royalties thereon or therefor.

This invention relates to multi-stage half-wave magnetic amplifiers and more particularly pertains to multi-stage half-wave magnetic amplifiers utilizing a differential coupling circuit which renders the load windings of an amplifying stage non-responsive to quiescent current components of the preceding stage under zero control signal conditions.

My U. S. Patent No. 2,683,843, which issued on July 13, 1954, discloses a half-wave multi-stage push-pull operated magnetic amplifier connected to motor field windings through a phase shifting impedance element in such a manner that, under zero control signal conditions, equal amplitude half-wave current pulses are applied to each of the windings of the motor with no resultant current flow through the phase shifting impedance. Consequently, under zero control signal conditions, the phase of the A.-C. components of the currents flowing through both field windings of the motor is the same, and there is no motor torque. Under a control signal, the amplitude of the half-wave current pulses applied to the field windings of the motor are differentially varied, and a current flows through the phase shifting impedance in a direction and amplitude dependent upon the sense of the difference in the amplitude of the pulses, the current flowing through one field winding of the motor containing a component which is shifted in phase from the A.-C. component of the current flowing through the other field winding thereby producing motor torque.

Such an amplifier, although generally satisfactory for controlling low inertia servomotors, is characterized by undesirable current influencing effects upon the load windings of an amplifying stage due to current components introduced therein by the quiescent current flowing in the preceding stage and also due to quiescent current drifts caused by impedance variations in the coupling circuit resulting from changing temperature conditions, aging of the components, and dissimilarity in the components of the coupling circuit.

The present invention, which is an improved modification of the circuit disclosed in the aforesaid Patent No. 2,683,843, provides a multi-stage half-wave push-pull magnetic amplifier wherein, under zero control signal conditions, the output load windings of an amplifying stage are not influenced by the quiescent current flowing in the preceding stage. This is achieved by winding two equally rated control windings on each saturable reactor core in such a manner that the ampere turns of the two control-winding components cancel each other under zero control signal conditions.

Generally, heretofore, half-wave multi-stage magnetic servo amplifiers were based upon special combinations of Wheatstone-bridge type arrangements, each of which contained two saturable reactors and four half-wave rectifiers. In such arrangements, it was necessary to match the saturable-reactor and dry-disk rectifier components of each stage of the amplifier. The fact that Wheatstone-bridge types of half-wave magnetic servo amplifier circuits contain four rectifier elements in each stage makes the matching procedures of the rectifiers much more difficult that that of the two saturable reactors.

The present invention contemplates the provision of a differential coupling circuit arrangement which makes it possible to reduce materially the well-known practical difficulties encountered in the matching procedure on dry-disk rectifier components of half-wave type magnetic servo amplifiers. For attaining this object, the invention is based upon the use of a special coupling circuit which contains differential type coupling windings carrying the half-wave current pulses of the preceding stage circuit. In this way, it is possible to employ two half-wave rectifier elements in each stage only, so that the matching procedure of the rectifiers will be considerably simplified and improved.

Another advantage derived by the present invention resides in the fact that one rectifier cell only may be used on each side of the differential type coupling circuit; whereas with Wheatstone-bridge type circuits, not less than two rectifier cells can be series-connected across the power supply voltage of the circuit.

In accordance with the invention there is provided in the output stage of a half-wave magnetic amplifier a differential type coupling input circuit, consisting of a pair of differentially wound control windings on each saturable reactor core of the output stage. The differentially wound control windings are coupled to the output of the preceding stage so that, under control signal conditions, the current flow appearing in the controlled winding of each reactor is the difference of the two control-winding components, and, under zero control signal conditions, no current flow appears in the controlled winding due to cancellation of the two control-winding components.

An important object of this invention is the provision of a half-wave multi-stage magnetic-amplifier control circuit wherein the output load windings are less influenced by any current drifts resulting from mismatched impedances of the circuit components.

Another object of this invention is to provide a half-wave magnetic-amplifier control circuit wherein, under zero control signal conditions, quiescent current components cancel in the input control windings of an amplifying stage.

A further object of the present invention is to reduce the practical difficulties encountered in the matching procedure of dry-disk rectifier components in half-wave multi-stage magnetic-amplifier circuits.

A still further object of the invention is to provide a circuit arrangement in half-wave magnetic-amplifier circuits wherein the number of rectifiers utilized are reduced with resultant improved interstage coupling conditions.

A primary object of the present invention is to provide a half-wave multi-stage magnetic-amplifier control circuit employing differential coupling circuits consisting of a pair of control windings so wound on each of the reactor cores of the output stage that the ampere turns of the two control-winding components in each core cancel each other thereby resulting in elimination of quiescent current interference which may influence the output load windings.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
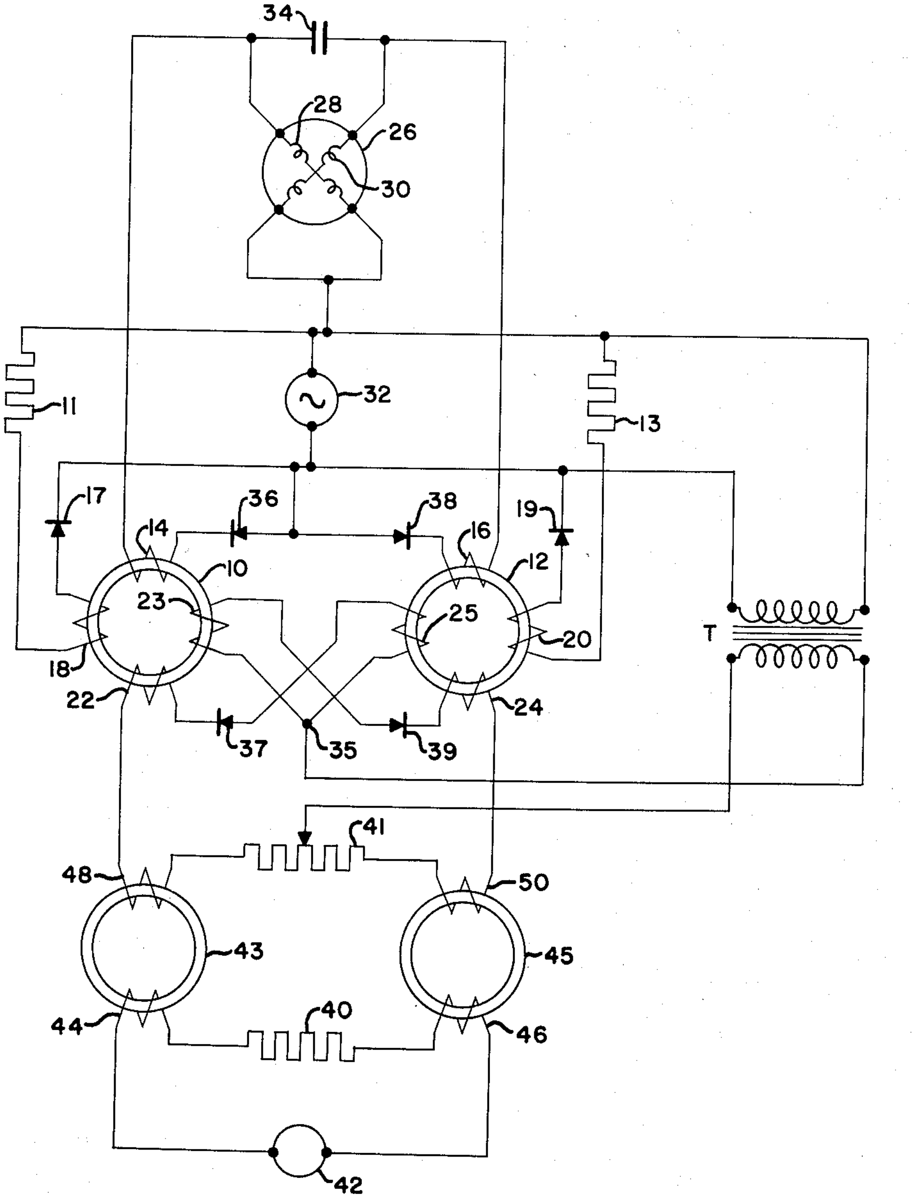
Fig. 1 is a schematic diagram of a two-stage push-pull half-wave magnetic amplifier control circuit utilizing differential coupling in accordance with the present invention.

Referring now to the drawings, wherein like reference characters designate like or corresponding parts throughout the several views, there is shown in Fig. 1, which is a preferred embodiment illustrating the general concept of the invention, a two-stage push-pull half-wave magnetic amplifier arrangement having an input stage including a pair of saturable reactor cores 43 and 45 and an output stage also including a pair of saturable reactor cores 10 and 12. As is conventional, cores 43, 45, 10 and 12 are formed of saturable magnetic material preferably having rectangular hysteresis-loop characteristics.

The magnetic amplifier is arranged to control a two-phase induction motor 26 having field windings 28 and 30. Both of the field windings 28 and 30 of the motor 26 have one end thereof connected to a source of A. C. potential 32, the other ends of the field windings being connected across a phase shifting impedance such as the capacitor 34, the phasing capacitor 34 being arranged so that current flows through the phasing capacitor in a direction and amplitude dependent upon the sense of the unbalance and the reactances of cores 10 and 12.

The input stage comprises a pair of saturable-reactor cores 43 and 45 having load windings 48 and 50 and control windings 44 and 46 wound thereon. Control windings 44 and 46 are connected in series with resistor 40 and are arranged so as to differentially vary the flux levels of the cores 48 and 50 in response to the application of either a D.-C. or amplitude modulated A.-C. voltage from a control signal source or error input source, generally indicated as 42. The input stage circuit may conveniently be energized from the supply source 32, through a step-down transformer T, which supplies half-wave current pulses to the load windings 48 and 50 of the input stage through unidirectional impedance elements 37 and 39 respectively, a balancing potentiometer 41 being provided to permit adjusting of the actual reactances of the cores 43 and 45 of the input stage.

The output stage comprises a pair of saturable reactor cores 10 and 12 each having load windings 14 and 16 and bias windings 18 and 20 wound thereon. The input circuit of saturable reactor core 10 consists of a differential coupling circuit formed by control windings 22 and 23 so wound on core 10 that the ampere-turns of the two control-winding components cancel each other; and, the input circuit of saturable reactor core 12 is a similar differential coupling circuit consisting of control windings 24 and 25 which are also wound on core 12 in such a manner that their current components tend to cancel each other.

The control windings 22—25 and 23—24 of the output stage are connected in series with the input-stage load windings 48 and 50, respectively, across the secondary winding of transformer T at junction 35 and at the tap-off at resistor 41. With this circuit arrangement, under zero control signal conditions, half-wave current pulses flow through the control windings 22, 23, 24 and 25 of the output stage, and through the load windings 48 and 50 of the input stage, which current is referred to as the "quiescent" current of the input stage. The level of the quiescent current can be controlled by proper selection of the total resistance value of potentiometer 41 to obtain the desired flux level in the output stage cores 10 and 12. By adjusting the tap on resistor 41, the impedances on both cores 43 and 45 may be made equal.

In addition, the quiescent current, since it is flowing through the control windings of the output stage, would normally tend to introduce quiescent-current components in the reactors 10 and 12 that would deleteriously influence the output appearing across load windings 14 and 16; but due to the fact that control windings 22 and 23 are differentially wound with respect to each other and control windings 24 and 25 are also differentially wound with respect to each other, the quiescent-current components introduced in cores 10 and 12 by current flow through control windings 22 and 25 are opposed by equal current components introduced in cores 10 and 12 by current flow through control windings 23 and 24, respectively. Thus, it becomes quite apparent that, under zero signal control conditions, there is substantially complete cancellation of any quiescent-current components introduced by the quiescent current which would undesirably affect the output appearing across the load windings 14 and 16.

The control windings 22—23 and 24—25, although mutually wound on their respective cores as to form a differential-coupling input circuit thereon, are also so arranged on their respective core as to differentially vary the flux level of the cores 10 and 12, respectively, during the non-conducting half cycle of the output stage, in response to the application thereto of either an A.-C. or D.-C. control voltage appearing in the output of the load windings 48 and 50 of cores 43 and 45, respectively.

Half-wave current pulses having relative amplitudes correlative with the control signal applied to the magnetic amplifier are also applied to the field windings 28 and 30. For this purpose, the A.-C. potential from the source 32 is applied through an unidirectional impedance element such as the dry-disk rectifier 36 and load winding 14 to the motor field winding 28, the A.-C. potential from source 32 also being applied through the unidirectional impedance 38 and load winding 16 to the motor field winding 30. The rectifiers 36 and 38 are phased so that current flows through the load windings 14 and 16 during the same half-cycle of the A.-C. potential from the source 32. When the reactances of the saturable-reactors with cores 10 and 12 are equal, the half-wave current pulses applied to the motor field windings 28 and 30 are equal, and no current flows through the phasing capacitor 34. Consequently, the A.-C. components of the currents flowing through motor windings 28 and 30 are in phase, and there is no motor torque.

The polarity of the supply voltage applied to the input stage current is 180° out of phase with the polarity of the supply voltage applied to the output stage and to the motor windings 28 and 30, whereby the input stage is conducting during the non-conducting half-cycle of the output stage, and vice versa. Therefore, control flux is established in the cores 10 and 12 during the non-conducting half-cycle of the output stage which half-cycle corresponds in time relation with the conducting half-cycle of the input stage.

Thus, when the control signal is other than zero, the flux levels preset in the cores 43 and 45 during the non-conducting half-cycle of the input stage will be different, and consequently the cores will fire at different points during the succeeding conducting half-cycle of the input stage. The half-wave current pulses applied through load windings 48 and 50 will thus differ in amplitude, and there will be resultant currents flowing through the control windings 22—25 and 23—24, the resultant currents being dependent upon the sense of the difference in flux levels preset in the cores 43 and 45 by the control signal from source 42. The resultant current flowing through control windings 22 and 25 opposes the resultant current flowing through the control windings 23 and 24, respectively, thereby producing a difference current component in each of cores 10 and 12. These difference current components preset the flux levels in the cores 10 and 12 during the non-conducting half-cycle of the output stage which corresponds in time relation with the conducting half-cycle of the input stage, the preset flux levels in cores 10 and 12 being determined by the sense of the difference in flux levels of cores 43 and 45. During the succeeding conducting half-cycle of the output stage, the cores 10 and 12 will fire at different points, and the half-wave current pulses applied through the motor windings 28 and 30 will thus differ in amplitude, resulting in a current flowing through the capacitor 34 in a direction dependent on the sense of the difference in flux levels originally preset in the cores 43 and 45 by the control signal from source 42.

In order to regulate the point during the conducting half-cycle of the output stage in which cores 10 and 12 fire, the cores are preferably biased by suitable bias circuits such as illustrated in Fig. 1. Bias winding 18 is energized from the A.-C. source 32 through the resistor 11 and unidirectional device 17, and bias winding 20 is energized from the source 32 through resistor 13 and unidirectional device 19, resistors 11 and 13 being of such value that under zero signal conditions the cores saturate at the desired point during the conducting half-cycle of the output stage. Adjustment of the firing angles of the cores determines the magnitude of the quiescent current which flows through the motor field windings and hence determines the level of the damping current. It is to be understood, however, that any other suitable bias circuit may be utilized in lieu of the circuit illustrated.

Figure 2:
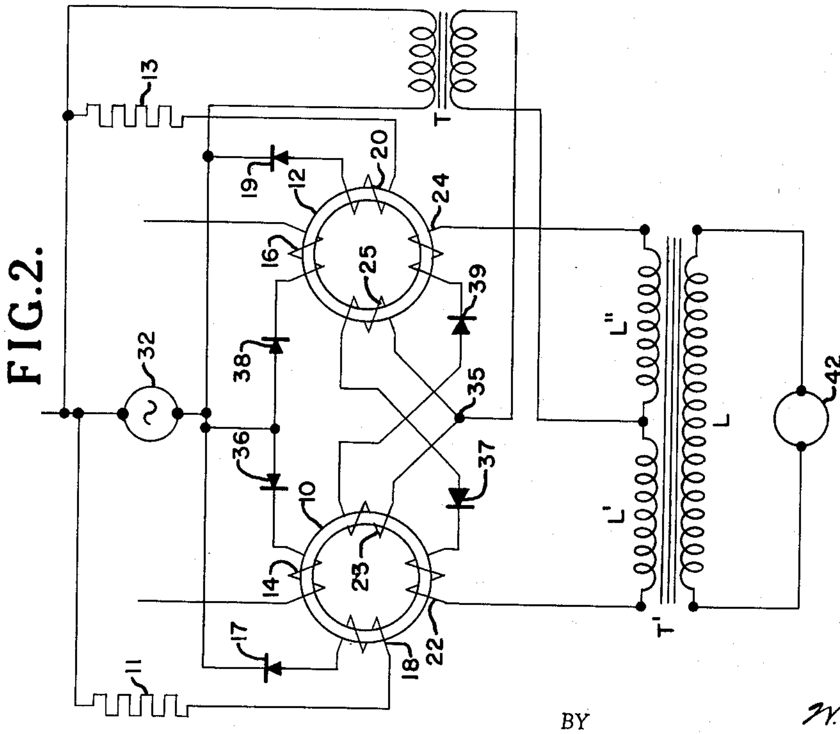
Fig. 2 is a modification of Fig. 1 having a modified input circuit arrangement.

Referring now to Fig. 2, there is illustrated a modification of Fig. 1 employing a transformer T′ in lieu of saturable reactor cores as the input stage of the amplifier. The output stage of Fig. 2 is similar to the output stage illustrated in Fig. 1 and like reference numerals are utilized to designate similar elements. The tranformer T′ has its primary winding L connected across the control signal source 42, its secondary winding L′ of the center-tapped secondary winding connected serially with control windings 22 and 25 across the secondary winding of transformer T, and its secondary winding L″ serially connected with control windings 24 and 23 across the secondary winding of transformer T. Otherwise the circuit arrangement of Fig. 2 operates and functions in the same manner as the circuit of Fig. 1.

Figure 3:
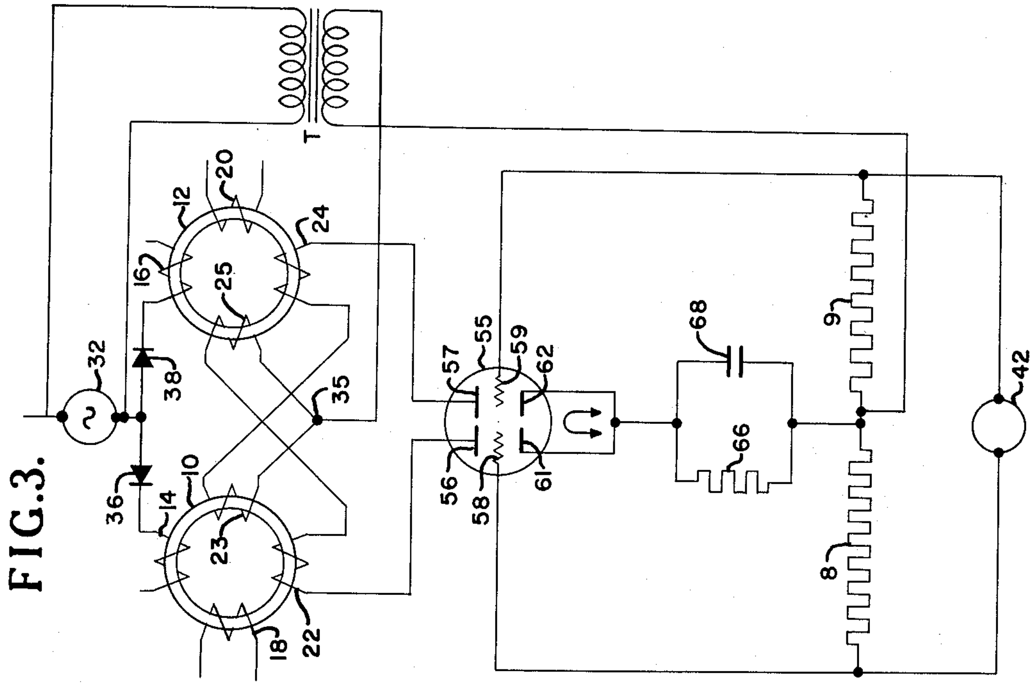
Fig. 3 is a modification of the invention illustrated in Fig. 1 and utilizes a pair of triodes in lieu of dry-disk rectifiers.

Fig. 3 also illustrates another modification of the circuit of Fig. 1 and employs a similar output stage with like reference numerals designating similar elements. An A.-C. energized dual-triode tube 55 is employed as the unilateral conductive device in lieu of the rectifiers 37 and 39 of Fig. 1. The plate supply potential for tube 55 is an A.-C. potential supplied through transformer T. For this purpose, the anode-cathode circuit of triode section 56, 58, 61 is serially connected with control windings 22 and 25 across the secondary winding of transformer T, and the anode-cathode circuit of triode section 57, 59, 62 is serially connected with control windings 24 and 23 across the secondary winding of transformer T.

Resistor 66 and capacitor 68 are connected to the cathodes 61 and 62 to provide cathode bias for the triode sections of tube 55. The D.-C. or amplitude modulated A.-C. control signal from source 42 is applied through a divider network consisting of equal value resistors 8 and 9 to the control grids 58 and 59.

In operation, during the positive half-cycle of source 32 which is to be construed to be the conducting half-cycle of cores 10 and 12, the anodes 56 and 57 are negative with respect to cathodes 61 and 62, and there is no current flow through the dual-triode 55. Under this condition, any control signal from source 42 would have no effect on either tube 55 or control windings 22, 23, 24, and 25. During the negative half-cycle of source 32, which half-cycle is the non-conducting half-cycle of cores 10 and 12, the two triode sections of tube 55 conduct, and the currents flowing through the two triode sections are amplitude modulated by the control signal applied to the control grids 58 and 59. These currents also flow through control windings 22, 23, 24 and 25 to preset the flux level of cores 10 and 12 during their non-conducting half-cycle to subsequently fire cores 10 and 12 at different instants of time during the succeeding conducting half-cycle of cores 10 and 12. Otherwise, the remainder of the circuit in Fig. 3 operates the same as the circuit of Fig. 1. In addition to providing unidirectional current flow, tube 55 also functions as an amplifier.

Although a triode is used in the circuit of Fig. 3, it is to be understood that any multigrid electron discharge device, such as a tetrode or pentode, may effectively be utilized without departing from the scope of the invention and the teachings herein.

Figure 4:
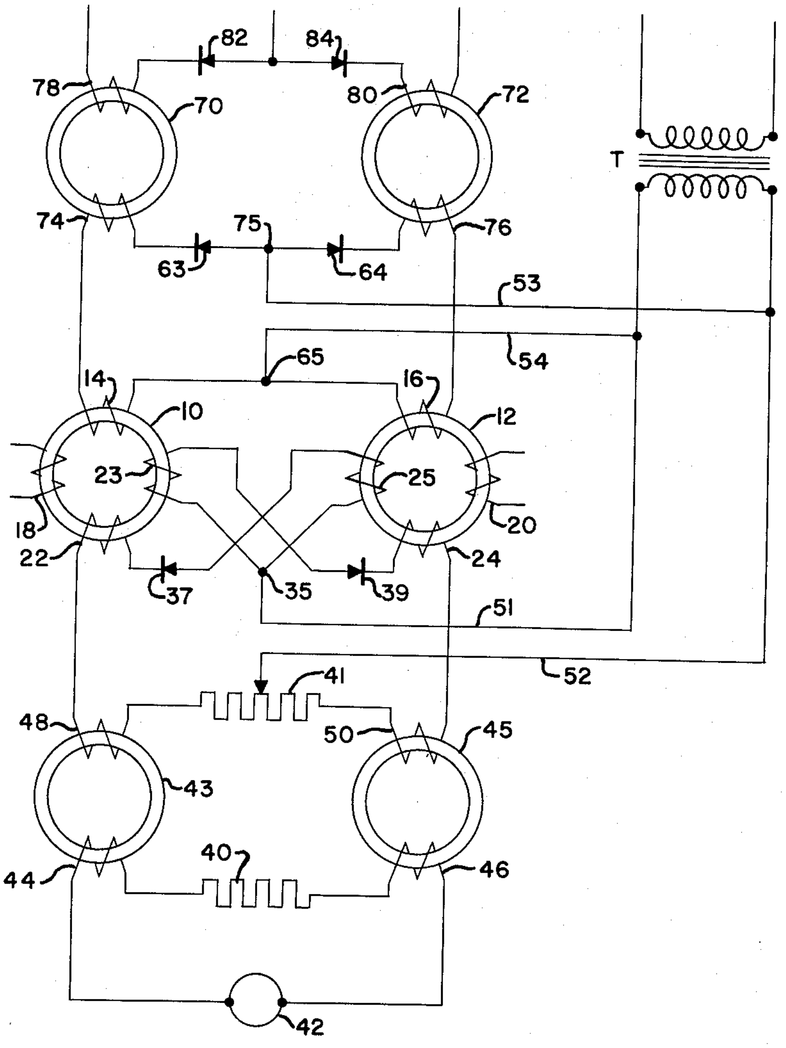
Fig. 4 is a schematic diagram of a three-stage push-pull half-wave magnetic amplifier control circuit utilizing differential coupling in accordance with the invention.

Referring now to Fig. 4, there is illustrated a three-stage arrangement of which the first two stages employ differential coupling windings in a manner similar to Fig. 1, like reference numerals designating similar elements. The input stage circuit is coupled with the interstage circuit by means of the differential windings 22—23 and 24—25, and load windings 14 and 16 of the interstage circuit are serially connected to control windings 74 and 76, respectively, of the output stage circuit, which output stage circuit comprises reactor cores 70 and 72 each having control windings 74 and 76 and load windings 78 and 80 wound thereon. Load windings 78 and 80 are connected to an A.-C. supply voltage (not shown) and utilization device (not shown) in the same manner illustrated by the output stage of Fig. 1. The supply voltage is applied, through a step-down transformer T, to load windings 14 and 16 through leads 53 and 54 and to load windings 48 and 50 through leads 51 and 52.

The polarity of the supply voltage applied to the input stage circuit is in phase with the polarity of the supply voltage applied to the output stage circuit, and the polarity of the supply voltage applied to the interstage circuit is 180 degrees out of phase with the supply voltage applied to the input and output stages. Therefore, the interstage is conducting during the non-conducting half-cycle of the input and output stages, and vice versa. The circuit of Fig. 4 employs differential coupling between the input stage circuit and the interstage circuit in accordance with the teaching of the invention as discussed heretofore with respect to Fig. 1, but otherwise the remainder of the circuit is conventional in multi-stage half-wave magnetic amplifier arrangements.

Figure 5:
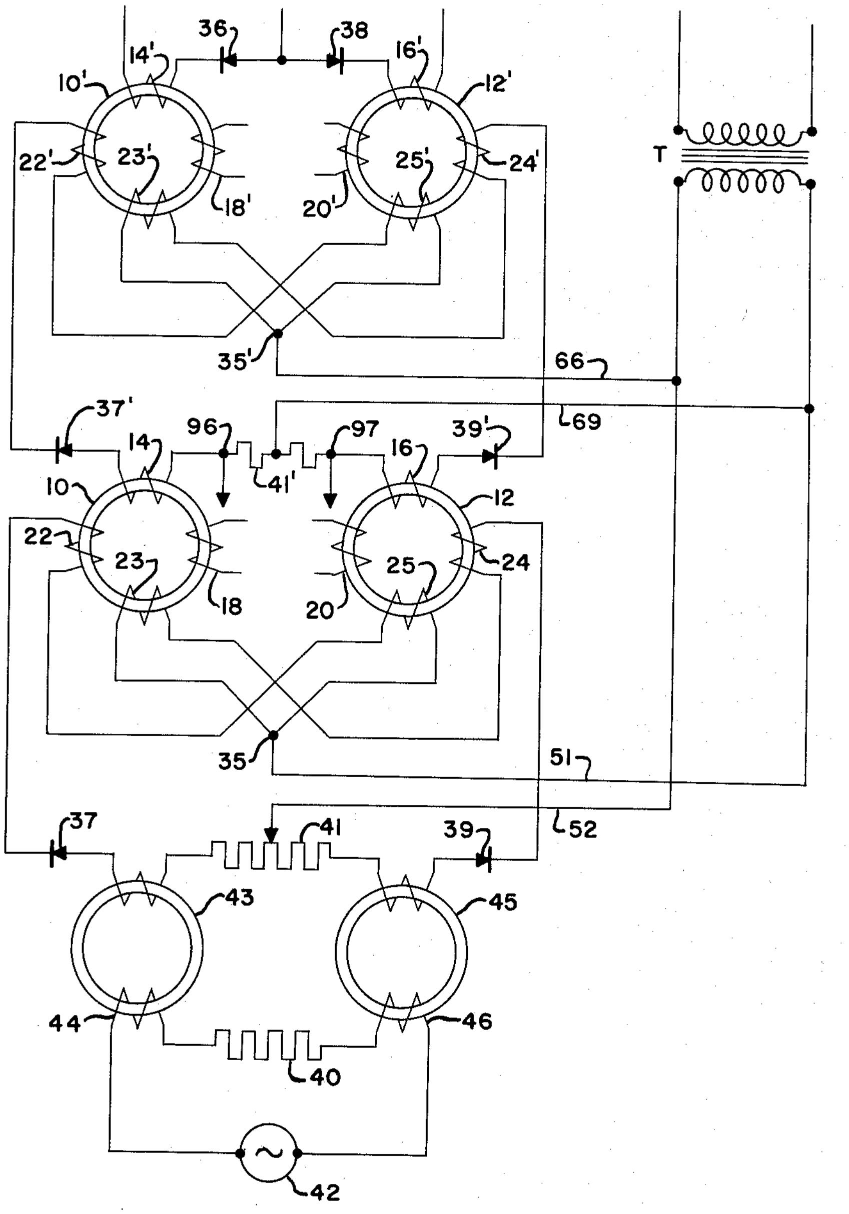
Fig. 5 is a schematic diagram of a three-stage push-pull half-wave magnetic amplifier control circuit wherein a pair of stages each having a differential coupling circuit arrangement thereon are connected in cascade.

Fig. 5 illustrates a three-stage half-wave magnetic amplifier arrangement in which two stages employing differential coupling control windings are connected in cascade. The input stage and the interstage, with the exception of its load winding circuits, are similar in circuitry to the input and output stages, respectively, of Fig. 1, like reference numerals designating similar elements. Load windings 14 and 16 of cores 10 and 12 are serially connected with control windings 22′—25′ and 23′—24′, respectively, of cores 10′ and 12′ across the secondary winding of transformer T, the rectifiers 37′ and 39′ being phased so that current flows through windings 14 and 16 during the same half-cycle, which half-cycle is 180 degrees out of phase with the conductive half-cycle of the input stage, as in the circuit of Fig. 4. The control winding 22′ is differentially wound with respect to control winding 23′ on core 10′, and control winding 24′ is differentially wound with respect to control winding 25′ on core 12′. The load windings 14′ and 16′ are connected to an A.-C. supply source (not shown) and a utilization device (not shown), as per Fig. 1. The polarity of the supply voltage applied to the input stage is in phase with the polarity of the supply voltage applied to windings 14' and 16' of the output stage, as in Fig. 4. If desired, derivative feedback may be obtained from the potential difference across resistor 41' at junction 96 and 97.

It is to be understood that differential type coupling circuits of the present invention may be used in connection with output stage and interstage circuits, with input stage and interstage circuits, or signal input circuits of the phase-sensitive rectifier type without departing from the spirit and scope of the invention.

Although not shown, the biasing circuits in Figures 3, 4 and 5 and the transformer T in Figures 4 and 5 are connected to an A.-C. supply source in the same manner illustrated in Fig. 1.

It is also to be understood that, although the output windings have been referred to herein as the load windings, they may also be correctly and properly defined as the controlled windings.

Furthermore, the number of turns of the various windings of the saturable-reactor cores may be varied in many ways, and the number and size of the dry-disk rectifiers may also be varied according to certain voltage and current operating conditions and to special requirements of magnetic servo amplifier arrangements.

From a comparison of the well-known Wheatstone-bridge type coupling circuit with the differential type coupling circuit of the present invention, it is apparent that the invention offers the technical advantage of requiring less rectifier elements, thereby permitting a much simpler matching procedure. In addition, experimental investigations have proved that the power gain of an arrangement, as revealed by the present invention is about 1.5 to 2 times greater than that of an equivalent Wheatstone-bridge circuit using the same saturable reactor and rectifier components in both cases, and working under the same voltage and current operating conditions in both cases.

From the foregoing, it is apparent that the invention provides interstage coupling circuits for multi-stage half-wave magnetic amplifiers in which a pair of equally rated control windings are differentially wound on each reactor core of a desired stage and connected to the output of a preceding stage to suppress quiescent current interference arising from the quiescent current flowing in the preceding stage. It is additionally apparent that the invention presents interstage coupling arrangements for multi-stage half-wave magnetic amplifiers which require less rectifier elements for optimum operating conditions than heretofore possible in multi-stage half-wave magnetic amplifiers.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a multi-stage half-wave magnetic amplifier having a plurality of cores of saturable magnetic material in at least one stage, an interstage coupling circuit for coupling said one stage to the output circuit of the immediately preceding stage and comprising, in combination, a source of alternating current, a pair of control windings differentially wound on each core of said one stage, first and second parallel branch circuits connected to said alternating current source through the output circuit of said preceding stage, said first branch circuit including in series one control winding of each core of said one stage, said second branch circuit including in series the other control winding of each core of said one stage, and a unilateral conducting device in each of said branch circuits, the said devices being so poled that half-wave current pulses flow through each of said branch circuits on the same half-cycle of said alternating current source.

2. The circuit of claim 1, wherein the control windings of each pair of windings are so dimensioned and wound with respect to each other that the current components induced in each core, by current from said alternating current source flowing through the control windings, neutralize each other.

3. The circuit of claim 2, wherein the serially connected control windings in said first branch circuit are wound in the same direction, and the serially connected control windings in said second branch circuit are wound in the same direction but in a direction opposite to the winding direction of said first branch circuit.

4. The circuit of claim 1, wherein the output circuit of said preceding stage includes a pair of inductive windings, one of said inductive windings being connected in series with the control windings in said first branch circuit and the other inductive winding being connected in series with the control windings in said second branch circuit.

5. The circuit of claim 4, wherein said pair of inductive windings form a center-tapped secondary winding of a transformer of which the primary winding is adapted to have a control signal applied thereto, said alternating current source having one side thereof connected to the center-tap of said secondary winding and the other side thereof connected to one control winding of each core of said one stage.

6. The circuit of claim 4, wherein said pair of inductive windings are the load windings disposed on a pair of saturable reactor cores in said preceding stage.

7. The circuit of claim 6, further including a resistor connected between the two load windings, said alternating current source having one side thereof connected to one control winding of each core of said one stage and having the other side thereof connected to said resistor by means of an adjustable resistor contact whereby the impedances of said branch circuits may be equalized.

8. The circuit of claim 1, wherein the output circuit of said preceding stage includes a pair of equal valued resistors connected to form a center-tapped divider network which is adapted to have a control signal applied thereto, and wherein said unilateral conductive devices each consists of an electron discharge device having at least anode, cathode, and control grid electrodes; and further including cathode biasing means connecting the cathodes of said discharge devices to said center-tap, the control grid of one of said discharge devices being connected to one end of the divider network, the control grid of the other of said discharge devices being connected to the other end of the divider network, the anodes of said discharge devices being connected to the control windings, said alternating current source having one side thereof connected to one control winding of each core of said one stage and having the other side thereof connected to said center-tap.

9. In a multi-stage half-wave magnetic amplifier having a plurality of cores of saturable magnetic material in at least one stage, an interstage coupling circuit for coupling said one stage to the output circuit of the immediately preceding stage and comprising, in combination, a source of alternating current, a main control winding and an auxiliary control winding on each core of said one stage, all of said main windings being wound in the same direction and all of said auxiliary windings being wound in a direction opposite to said main windings, a pair of equally rated load impedances in the output circuit of said preceding stage, first and second parallel branch circuits connected across said alternating current source, said first branch circuit including in series all of said main windings and one of said impedances, said second branch circuit including in series all of said auxiliary windings and the other of said impedances, and a unilateral conducting device in each of said branch circuits, the said devices being so poled that half-wave current pulses flow through each of said branch circuits during the same half-cycle of said alternating current source, each of said main windings being so dimensioned and wound with respect to its respective auxiliary winding that the current component induced in each core by current flowing through said main windings opposes the current component induced in each core by current flowing through the auxiliary windings so that current component neutralization occurs at each of said cores when under the influence solely of the energizing potential from said alternating current source.

10. The circuit of claim 9, wherein said impedances are the two inductive sections of a center-tapped secondary winding of a transformer of which the primary is adapted to have a control signal applied thereto, one side of said source being connected to the center-tap of said secondary winding and the other side being connected to the main windings on alternate cores and to the auxiliary windings on the other cores.

11. The circuit of claim 9, wherein each of said impedances is the load winding disposed on separate cores of saturable magnetic material in said preceding stage, and further including a resistor connected between the two load windings, said alternating current source having one side thereof connected to a control winding of each core of said one stage and the other side thereof connected to said resistor by means of an adjustable resistor contact whereby the impedances of said branch circuits may be equalized.

12. The circuit of claim 9, wherein each of said unilateral conducting devices consists of a triode electron discharge device having its anode-cathode circuit connected in series with the control windings in its respective branch circuit, and further including a pair of equal valued resistors connected to form a center-tapped divider network adapted to have a control signal applied across the ends thereof, bias means connecting the cathodes of said triode sections to said center-tap, and means connecting the ends of said divider network to the control grids of said discharge devices.

13. A multi-stage half-wave magnetic amplifier, comprising an input stage having a plurality of cores of saturable magnetic material adaptable to be responsive to a control signal; a succeeding magnetic amplifying stage having a pair of saturable core reactors; a source of alternating current; a first closed series circuit including said source, a load winding on a first core of said input stage, a main control winding on one of said reactors, a main control winding on the other of said reactors, and a unilateral conductive device; a second closed series circuit including said source, a load winding on a second core of said input stage, an auxiliary control winding on said one reactor, an auxiliary control winding on said other reactor, and a unilateral conductive device; the said devices being so poled that half-wave current pulses flow through each of said closed series circuits during the same half-cycle of said alternating current source, and said main and auxiliary windings on each of said reactors being so wound as to provide differential coupling whereby the current components of the main windings oppose the current components of their respective auxiliary windings; a load winding for each of said reactors connected across said source through a pair of rectifiers, said rectifiers being so poled that half-wave current pulses flow through each reactor load winding during the same half-cycle of said alternating current source but during the half-cycle which the said first and second series circuit are non-conductive; and an output load circuit connected across said reactor load windings.

14. The amplifier of claim 13, wherein said output load circuit comprises a pair of closed magnetic circuits each having a main control winding and an auxiliary control winding similarly wound with respect to each other as the main and auxiliary windings of said reactors; a first closed series circuit for said closed magnetic circuits including the main windings of said magnetic circuits, one of said reactor load windings, one of said pair of rectifiers, and said alternating current source; a second closed series circuit for said closed magnetic circuits including the auxiliary windings of said magnetic circuits, the other of said reactor load windings, the other of said rectifiers, and said alternating current source; a load winding for each of said magnetic circuits connected across said source through a pair of rectifiers which are so poled that half-wave current pulses flow through each magnetic circuit load winding during the same half-cycle that current flows through the main and auxiliary windings of said reactors.

15. The combination of claim 13, including means for biasing said reactors to adjust the level of the quiescent current flowing through the load windings of said input stage.

16. The circuit of claim 9, further including biasing means for the cores of said one stage to adjust the level of the quiescent current flowing through the main and auxiliary windings of said one stage, said biasing means being energized from said alternating current source.

17. A multi-stage half-wave magnetic amplifier, each stage comprising a pair of closed magnetic circuits, an inductive load winding on each magnetic circuit, a control circuit on each magnetic circuit arranged in push-pull relation to its respective load winding, a source of alternating current, the load windings in each stage being connected to said source in parallel branch circuits, a unidirectional conducting device in each branch circuit, said device poled in the same direction for the branch circuits of each stage and the devices for successive stages being oppositely poled, the output leads of the branch circuits being connected to the control circuit of the succeeding stage, the control circuit of at least one of the stages including a main control winding and an auxiliary control winding on each of the magnetic circuits of said one stage, each of said main windings being so dimensioned and wound with respect to its respective auxiliary winding that the current component induced in each closed magnetic circuit of said one stage by current flowing through said main windings opposes the current component induced in each closed magnetic circuit of said one stage by current flowing through the auxiliary windings so that current component neutralization occurs at each closed magnetic circuit of said one stage when under the influence solely of the energizing potential from said alternating current, an input circuit for the magnetic amplifier adapted to have a control signal applied thereto, and an output circuit adapted to control a utilization device in a manner correlative to the applied control signal.

18. A claim according to claim 17, further including means for biasing the magnetic circuits of said one stage to adjust the level of the quiescent current flowing through the load windings of the stage immediately preceding said one stage.

No references cited.